United States Patent [19]

Lymperis

[11] Patent Number: 4,460,271
[45] Date of Patent: Jul. 17, 1984

[54] CROPPING DEVICE

[76] Inventor: William Lymperis, 400 N. Acacia, Apt. B-10, Fullerton, Calif. 92631

[21] Appl. No.: 358,368

[22] Filed: Mar. 15, 1982

[51] Int. Cl.³ .............................................. G03B 27/58
[52] U.S. Cl. .................................................... 355/74
[58] Field of Search ........................................ 355/74

[56] References Cited

U.S. PATENT DOCUMENTS

| 1,073,169 | 9/1913 | Roberts . | |
|---|---|---|---|
| 1,116,888 | 11/1914 | Heyn . | |
| 1,277,318 | 8/1918 | Johnson . | |
| 1,330,353 | 2/1920 | Smith . | |
| 1,662,066 | 3/1928 | Krumm . | |
| 1,976,278 | 10/1934 | Cook . | |
| 2,246,920 | 6/1941 | Kromholz | 355/74 |
| 2,342,525 | 2/1944 | Berry . | |
| 2,403,614 | 7/1946 | Ross . | |
| 2,412,507 | 12/1946 | Hunter | 355/74 |
| 2,544,883 | 3/1951 | Isaac et al. | 355/74 |
| 2,560,937 | 7/1951 | Ens . | |
| 2,626,467 | 1/1953 | Abbott . | |
| 2,677,893 | 5/1954 | Wahl . | |
| 2,702,944 | 3/1955 | Lane et al. | 355/74 |
| 3,470,644 | 10/1969 | Craig | 355/74 |
| 3,709,591 | 1/1973 | Alzmann | 355/74 |

FOREIGN PATENT DOCUMENTS 170835 of 1965 U.S.S.R. .............................. 355/74

Primary Examiner—Monroe H. Hayes
Attorney, Agent, or Firm—Edward D. O'Brian; K. H. Boswell

[57] ABSTRACT

A device for cropping photographs can be constructed utilizing upper and lower frames which are movable with respect to one another. Each of the frames has two edges located at right angles to one another; the frames are located one above another so that the edges of the frames define a rectilinear opening. The size of this opening can be varied by moving the two frames in a linear manner. The ratio between the lengths of the sides of the opening can be varied by varying the relative positions of the upper and lower frames including the noted edges.

2 Claims, 8 Drawing Figures

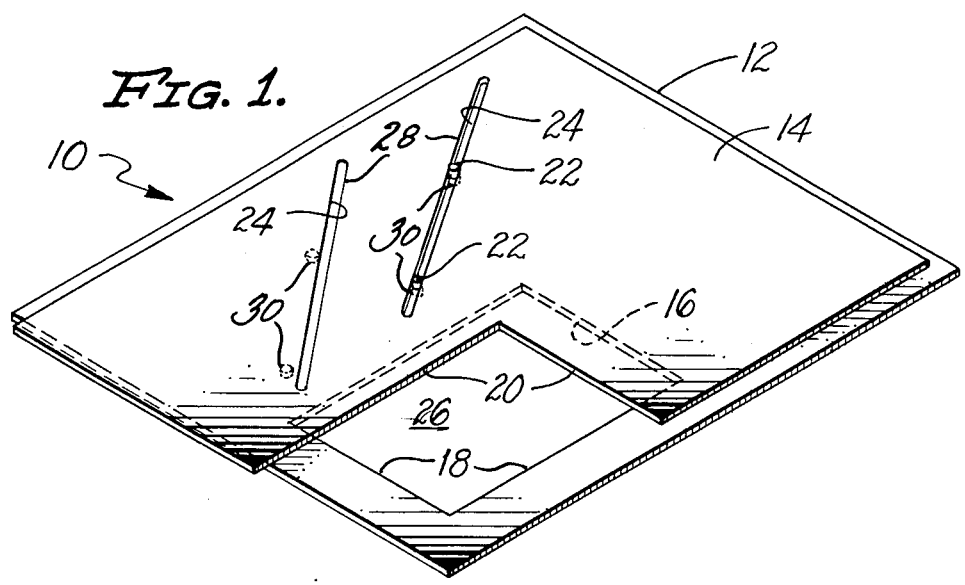
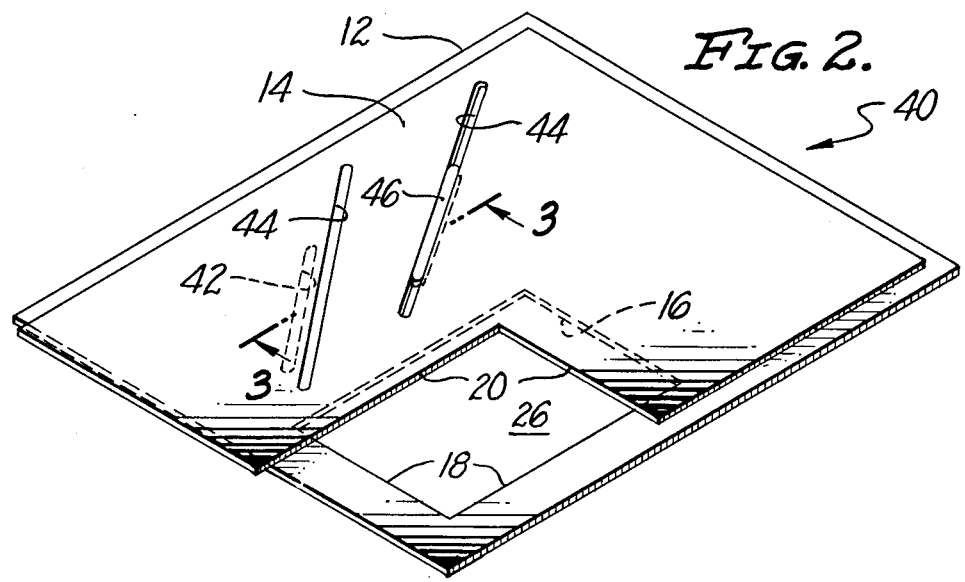
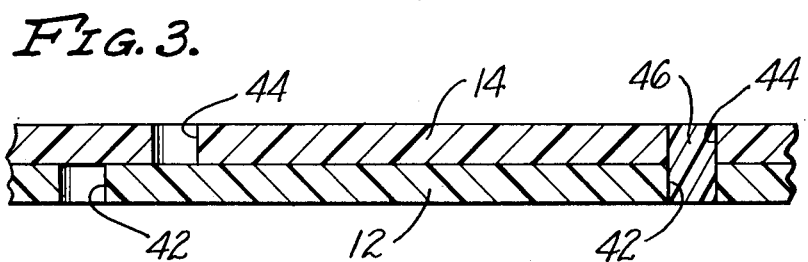

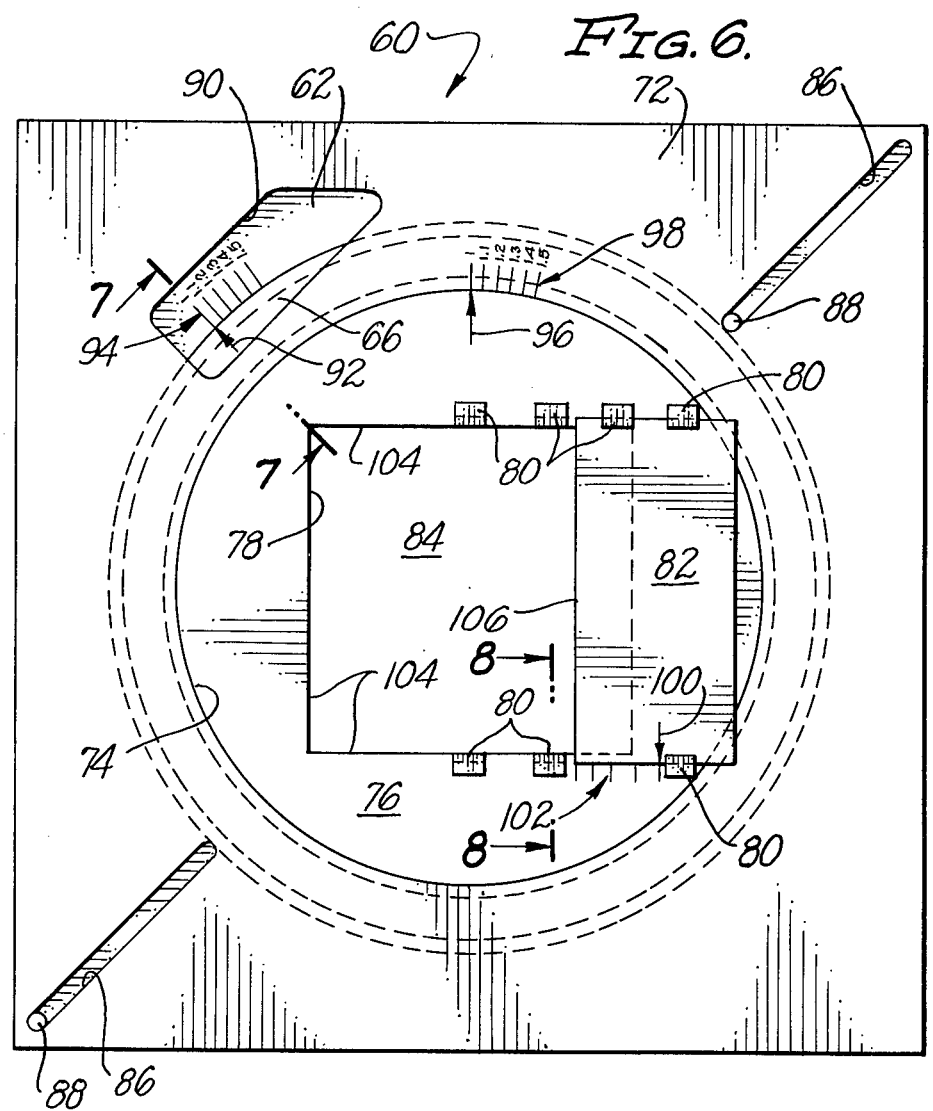
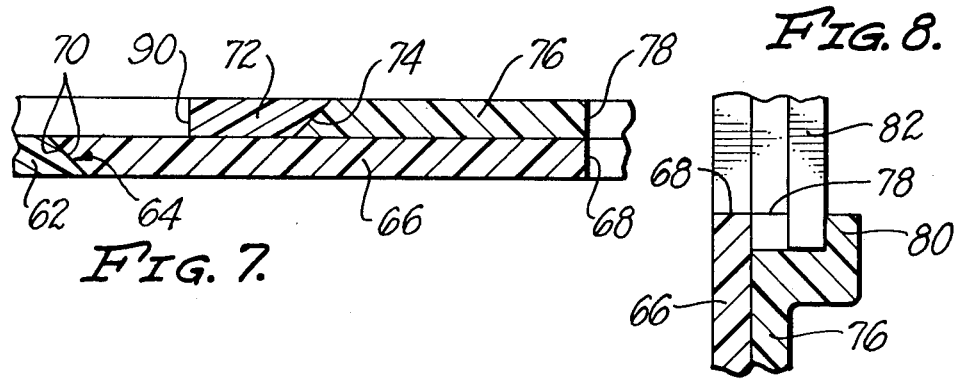

CROPPING DEVICE

BACKGROUND OF THE INVENTION

This invention pertains to new cropping devices such as are commonly utilized for photographic purposes.

Because the word "crop" has a variety of different meanings in different fields, it is considered that an explanation of the present invention should include a definition of this word as used in this specification. As employed herein the word "crop" is used to designate the act of masking parts of a print, negative or the like so that the remainder of the print or negative includes only portions of the original which, for one reason or another, are desired in a final print or negative. These cropping devices can be utilized for several different purposes.

On occasion, they can be utilized for the purpose of cutting down a comparatively large print so that a portion of that print will fit a frame or other member which is smaller than the original print. When a cropping device is used in this manner the device will enable the individual using the cropping device to determine how the print will visually appear after certain portions of the original print, as delineated by the cropping device, are cut off or severed from the print itself. At times, the act of cutting off or severing these portions is also referred to as "cropping."

Cropping devices can also be utilized in delineating the parts of the print which will remain in a picture after the negative used to make the print has been employed, so as to make an enlargement of only a part of the negative. This is frequently quite desirable in preparing an enlargement of part of a print for exhibition purposes. This may also be desirable in connection with a preparation of the enlargement that is intended to fit a frame or mat having relative proportions which are different from those of the negative to be utilized in making the enlargement.

Virtually everyone who is reasonably familiar with "serious" photographic activity is familiar with the fact that various different types of devices and structures are known for use in cropping prints, negatives and the like. An understanding of the present invention is not considered to require an understanding, or even a discussion, of such prior related structures. It is believed that all such prior structures have been relatively undesirable for any one or more of a variety of different reasons such as cost, relative ease or use or the like. Because of the deficiencies of prior cropping devices, it is considered that there is a need for new and improved cropping devices.

SUMMARY OF THE INVENTION

The present invention is intended to fulfil this need. More specifically, it is intended to provide cropping devices which may be easily and conveniently manufactured at a comparatively nominal cost, which may be easily and conveniently used, which are not apt to become damaged as they are normally used, which can be employed for a variety of different cropping operations and which may be easily stored in a very minimal amount of space when not in use. The latter is considered to be important because of the limited space in many different facilities; the former is considered to be important because of the need to be able to adjust the cropping device so as to vary both the size and relative proportions of an opening in the device.

In accordance with this invention, a device for cropping photographs having upper and lower frames which are movable with respect to one another, each of said frames having two edges located at a right angle with respect to one another, said frames being located one above another so that said edges on said frames define a rectilinear opening, said frames being movable relative to one another so that the size of said opening can be varied in an improvement which comprises: cooperating means on said frames permitting said frames to be moved to change both the ratio of the lengths of the sides of said opening and the dimensions of said opening when said opening has any specific ratio between the lengths of its sides.

BRIEF DESCRIPTION OF THE DRAWING

Because of the nature of the present invention it is best fully explained with reference to the accompanying drawings in which:

FIG. 1 is an isometric view of a simple cropping device in accordance with the present invention;

FIG. 2 is an isometric view of a modified form of the cropping device shown in FIG. 1;

FIG. 3 is a partial cross-sectional view taken at line 33 of FIG. 2;

FIG. 6 is a top plan view of a somewhat different form or embodiment of the cropping device of my invention;

FIG. 7 is a partial cross-sectional view taken at line 77 of FIG. 6;

FIG. 8 is a partial cross-sectional view taken at line 88 of FIG. 6.

Figure 4:
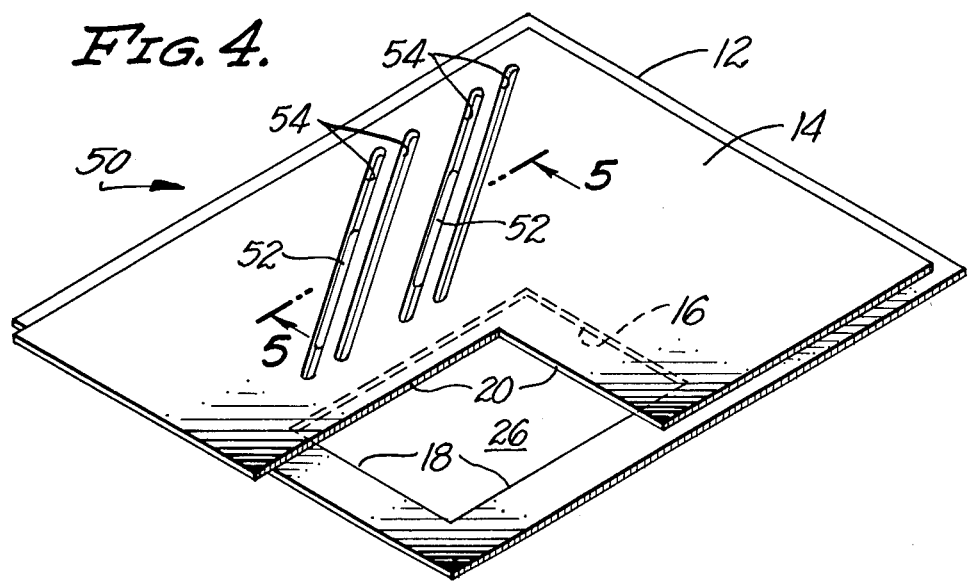
FIG. 4 is an isometric view of a second modified form of the cropping device shown in FIG. 1.
Figure 5:
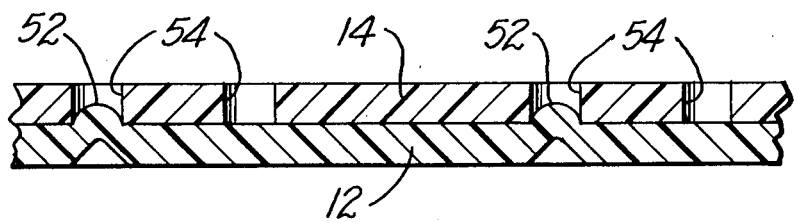
FIG. 5 is a partial cross-sectional view taken at line 55 of FIG. 4.

In a broad sense, each of the different embodiments of the invention illustrated may be considered as a "preferred" embodiment of the present invention since different of the embodiments illustrated have various features and characteristics which may or may not make each of them more desireable for one utilization than another.

Those skilled in the application of geometry to various simple mechanical devices will realize that a number of different changes may be made in the precise structures illustrated through the use or exercise of routine engineering skill. For this reason, the present invention is not to be considered to be limited by the accompanying drawings. Any specific structure coming from the scope of the appended claims is to be considered as to be coming within the scope of this invention regardless of the specific construction of such a structure or the way it may or may not appear.

DETAILED DESCRIPTION OF THE INVENTION

In FIG. 1 of the drawing is shown a simple cropping device 10 in accordance with the present invention which includes a lower frame 12 and an upper frame 14. The frames 12 and 14 may be formed of any conveniently available flat, sheet-like, reasonably self-supporting material. This lower frame 12 includes a comparatively large rectilinear opening 16. The precise demensions of this opening 16 are relatively unimportant. It is however, important that this lower frame 12 include two linear edges 18 of the opening 16 which are located at right angles with respect to one another. The upper frame 14 also includes two linear edges 20 which are located at a right angle with respect to one another.

These frames 12 and 14 are adapted to be located with respect to one another as indicated in the accompanying FIG. 1 so that cooperating "means" 22 and 24 on the lower and upper frame 12 and 14 respectively can be utilized to support the upper frame 14 on the lower frame 12 in such a manner that the edges 18 and 20 on these two frames 12 and 14 define an opening 26. This opening 26 is of lesser dimension than the opening 16 and in effect is a part of the opening 16. The dimensions of the opening 26 may be changed through the use of the means 22 and 24 briefly indicated in the preceding.

The precise means 22 on the lower frame 12 consists of a set of two pins 22. It is noted that the pins 22 are capable of being located in any of a series of sets of openings 30 in the lower frame 12. Each of these sets is located in such a manner that as the pins 22 are located in it, these pins define a line located at an angle to any edge 18. The precise means 24 with the upper frame 14 consists of any of a series of linear openings or slots 28. These grooves 24 extend linearly at different angles to the edges 18. These pins 22 can be located in any of the openings 24 so that the upper frame 14 will be supported in the lower frame 12 in such a manner that the size of the opening 26 may be varied as may be desired by sliding the upper frame 14 on the lower frame 12. The ratio between edges 18 and 20 may be varied by relocating the pins 22 in different of the sets of openings 30 and different of the slots 24. As a result of adjustment of the relative position of the frames 12 and 14 a photograph located under the opening 26 may be viewed so as to give an indication as to how it will appear when cropped in various manners. This is considered to be particularly desirable if an enlargement of such a photograph is intended.

In FIG. 2 there is shown a modified cropping device 40 which is quite similar to the device 10. Similarly, in FIG. 4 there is shown a second modified cropping device which is closely related to the device 10. In the interest of brevity, these portions of the devices 40 and 50 which are identical or substantially identical to corresponding parts of the device 10 are not separately described herein and are designated in the drawing, and in this specification, by the numerals previously used to designate such parts, when this is necessary for explanatory purposes.

The device 40 differs from the device 10 in that the means 22 and 24 are somewhat different than previously indicated. In the device 40 sets of grooves 42 and 44 are located on the lower and upper frames 12 and 14 respectively. These grooves 42 and 44 are located at various angles relative to the edges 18 and 20. An elongated rod 46 is dimensioned so that it can be inserted in any groove 42 in lower frame 12. This rod 46 will fit into any of the grooves 44 so as to permit linear motion as previously indicated.

The device 50 differs from the device 10 in that the means 22 in the device 50 takes the form of a plurality of elongated linear ridges 52 which are shaped so that each of these ridges is adapted to fit within a groove 54 serving as a means 24 in the upper frame 14 in order to guide the movement of the upper frame 14 at an angle relative to the lower frame which is dependent upon which ridge 52 fits within which groove 54. It is noted that an excess of grooves 54 are provided in the device 50 so as to accomodate ridges 52 which are not being utilized for guidance purposes at any specific time.

These devices 40 and 50 have been shown and described so as to indicate what a variety of different means permitting linear movement can be employed within the context of this invention so as to achieve openings having different ratios between the lengths of their sides. In FIG. 6 there is shown a somewhat different type of device 60 which can be utilized for cropping purposes as indicated in the preceding. This device 60 includes a lower frame 62 having a centrally located opening 64. A disk 66 having a centrally located square opening 68 is located within this disk 66. This disk 66 and the frame 62 are preferably provided with beveled shoulders 70 so that the disk 66 is rotatably supported in the opening 64 without there being danger of the disk falling out of this opening.

The device 60 utilizes a flat upper frame 72 which substantially corresponds to the frame 62 in that it has a centrally located circular opening 74 which holds a disk 76. This disk 76 in turn is provided with a centrally located square opening 78. The disks 76 and 66 are capable of being rotated so as to directly overlay one another as shown. Guide tabs 80 are located on the disk 76 so as to support a slide 82 in such a manner that the slide can be moved so that the portion of the opening 64 which is visible will appear as a rectilinear viewing "window", or opening 84.

The frames 62 and 72 carry upper and lower cooperating means 86 and 88, respectively, which correspond to the means 22 and 24 previously described. The lower means 88 consists of pins 88 located on the frame 62 and the upper means 86 consists of elongated, aligned slots 86 in the upper frame 72. These means 86 and 88 are coordinated so as to permit linear movement of the upper frame 72 along a path which is aligned with a diagonal of the opening 78 and the opening 68 when these openings are aligned with one another.

During the use of the device 60 a window 90 is used so that a small pointer 92 on the disk 66 is aligned with a scale 94 so as to indicate the desired ratio between the sides of the rectangle to be obtained during cropping. Similarly, another pointer 96 on the disk 76 is rotated with another corresponding scale 98 on the upper frame 72 so as to indicate this same ratio. Concurrently, the slide 82 is moved relative to the opening 78 until such time as another pointer 100 on it designates the same ratio on a further scale 102 on the disk 76. At this point the relative dimensions of a composite visible opening defined by edges 104 of the opening 68 and edges 106 of the opening 78 may be varied by moving the upper frame 74 with respect to the lower frame 62. Such movement may be utilized in determining how a picture under the various openings will appear when cropped in accordance with the setting and movement of the device 60.

I claim:

1. A device for cropping photographs having upper and lower frames which are movable with respect to one another, each of said frames having two edges located at a right angle to one another, said frames being located one above another so that said edges on said frames define a rectilinear opening, said frames being movable relative to one another so that the size of said opening can be varied in which an improvement comprises:

said lower frame including a flat, rotatably mounted member, said upper frame including a corresponding flat, rotatably mounted member located above said member on said lower frame and capable of being rotated about the same axis as said member of said lower frame, said rotatable members each including rectilinear openings formed therein, said rectilinear openings capable of being aligned with one another by the rotation of one of said rotatable members, said upper frame also including a slide capable of being moved so as to mask a part of said opening in said rotatable member on said upper frame so as to change the ratio between the lengths of the sides of said opening, cooperating means on said frames permitting said frames to be moved to change both the ratio of the lengths of the sides of said opening and the dimensions of said opening when said opening has any specific ratio between the lengths of its sides, said cooperating means permitting said upper frame to be linearly moved with respect to said lower frame so as to offset said openings with respect to one another.

2. A device as claimed in claim 1 wherein:

said cooperating means including a pin and slot connection between said upper and lower frames.

* * * * *